United States Patent [19]
Civanlar et al.

[11] Patent Number: 5,805,805
[45] Date of Patent: Sep. 8, 1998

[54] SYMMETRIC METHOD AND APPARATUS FOR INTERCONNECTING EMULATED LANS

[75] Inventors: Seyhan Civanlar, Middletown Township, Monmouth County; Vikram R. Saksena, Freehold, both of N.J.

[73] Assignee: AT&T Corp., Middletown, N.J.

[21] Appl. No.: 511,430

[22] Filed: Aug. 4, 1995

[51] Int. Cl.[6] .............. G06F 13/14; H04L 12/46
[52] U.S. Cl. ................ 395/200.5; 395/200.53; 395/200.79; 370/409
[58] Field of Search .............. 395/200.1, 200.15, 395/200.11, 200.5, 200.68, 200.53, 200.54, 200.79; 370/254, 257, 401, 402, 409

[56] References Cited

U.S. PATENT DOCUMENTS

| | | | |
|---|---|---|---|
| 5,345,558 | 9/1994 | Opher et al. | 395/200.15 |
| 5,365,523 | 11/1994 | Derby et al. | 370/402 |
| 5,444,702 | 8/1995 | Burnett et al. | 370/254 |
| 5,457,681 | 10/1995 | Gaddis et al. | 370/402 |
| 5,519,836 | 5/1996 | Gawlick et al. | 395/200.15 |
| 5,568,471 | 10/1996 | Hershey et al. | 370/402 |
| 5,570,466 | 10/1996 | Oechsle | 395/200.15 |
| 5,577,033 | 11/1996 | Chang et al. | 370/402 |
| 5,581,552 | 12/1996 | Civanlar et al. | 370/396 |
| 5,583,862 | 12/1996 | Callon | 370/402 |
| 5,600,644 | 2/1997 | Chang et al. | 370/257 |
| 5,617,540 | 4/1997 | Civanlar et al. | 395/200.11 |

OTHER PUBLICATIONS

Madge Networks Inc; "LAN Emulation Over ATM—A Technology White Paper"; San Jose CA USA; Part No. 983-084-01, 1994.

*Primary Examiner*—Mark H. Rinehart
*Attorney, Agent, or Firm*—Stephen M. Gurey

[57] ABSTRACT

Multiple LAN emulation servers (LESs) and broadcast and unknown servers (BUSs) are employed to serve a single emulated LAN (ELAN). The LAN emulation clients (LECs) are assigned to sub-ELANs, each of which includes several LECs of the ELAN, e.g., those that are geographically close. Each such sub-ELAN includes its own LES and BUS. The LESs and BUSs of the sub-ELANs are connected so that the sub-ELANs form a single ELAN. The LESs/BUSs can be interconnected in any pattern that allows each LES/BUS to communicate with each other LES/BUS via at least one path, which need not be direct. The LES and BUS of each sub-ELAN presents themselves as proxy-LECs of the other sub-ELANs to which they are connected. The ELAN can include a LAN Emulation Configuration Server (LECS) for downloading the connection topology and forwarding rules to all the sub-ELANs. The topology and rules are downloaded each time the ELAN is configured, e.g., initially and when the network topology changes due to failures of servers or addition and deletion of servers.

22 Claims, 9 Drawing Sheets

SYMMETRIC METHOD AND APPARATUS FOR INTERCONNECTING EMULATED LANS

TECHNICAL FIELD

This invention relates to the interconnection of local area networks (LANs) and subportions thereof.

BACKGROUND OF THE INVENTION

The current embedded base of data networks are based on IEEE 802 Local Area Networks, i.e., so-called "Legacy LANs". These Legacy LANs are so-called "connectionless" because network entities exchange packets without establishment of a layer-2 connection. Many existing and emerging applications are designed to run primarily on legacy LANs. These applications reside on top of so-called "layer-2" and "layer-3" protocols such as Medium Access (MAC) and Internet Protocol (IP), respectively. As is well known in the art, the layers referred to are those of the international standards organization (ISO) seven layer networking reference model.

Asynchronous transfer mode (ATM) with its a) fixed size cell switching, b) scalability from few megabits to hundreds of megabits, c) ability to offer guaranteed quality of service (QoS) on a per connection basis, and d) connection orientation, is viewed as the enabling technology for high-speed multimedia networking. Therefore, it is desired in the art to interconnect legacy LANs and ATM end-stations, to themselves and to each other, using ATM. This has been achieved in the prior art in a variety of ways.

To describe the existing solutions, consider the example shown in FIG. 1 of two small networks 101 and 103, each representing a different logical subnet at layer-3. LAN 101 has sites 111, 113, and 115 which are interconnected through an ATM wide area network (WAN) 131. Hosts 111-1, 111-2 and 111-3 of site 111 are connected via Ethernet 111-4, hosts 113-1, 113-2, and 113-3 of site 113 are connected via Ethernet 113-4, and ATM hosts 115-1 and 115-2 are connected to an ATM switch 115-6 at site 115. Similarly structured, the second network, LAN 103, has only two hosts per Ethernet site.

A classical method for interconnecting these sites is so-called "bridging and routing". Consider the case of host 111-1 sending a data packet to the MAC address of host 113-2. All stations on Ethernet 111-4, and consequently, bridge 111-5 receives the packet. Bridge 111-5 a) builds broadcast ATM connections to bridge 113-5, hosts 115-1 and 115-2; b) encapsulates host 111-1's data packet on top of the ATM layer, and c) sends it over the ATM connections.

Bridge 113-5, hosts 115-1 and 115-2 receive the information transmitted over their respective ATM connections. Bridge 113-5 strips off the ATM encapsulation, converts the ATM cells into a MAC packet, and forwards it to Ethernet 113-4. Thus, all stations on Ethernet 113-4, and consequently, host 113-2 receives the data packet. Hosts 115-1 and 115-2 ignore the received data packet since it is not addressed to them.

Inter-LAN communication according to this technique is achieved through the use of external router 151, since networks 101 and 103 are in different layer-3 subnets. For example, if host 117-1 wants to communicate with host 111-1, host 117-1 sends a data packet to the MAC address of router 151, in which case bridge 117-5 builds an ATM connection to router 151 and sends an ATM encapsulated data packet thereto. Router 151 forwards the packet to bridge 111-5.

A deficiency of this method is that, since it is based on a broadcast principle, and thus mimics shared-medium operations, all data packets are broadcast to all ATM destinations, thereby flooding the network with broadcast traffic. The broadcast nature of the technique virtually requires a mesh network between all bridges and ATM hosts within a LAN, and all inter-LAN traffic must pass through router 151. Another deficiency of this method is the lack of an address resolution, i.e., translation, mechanism that can translate a MAC address into an ATM address, which is useful in the forwarding of unicast packets, since many MAC destinations are connected to ATM-attached bridges.

The ATM Forum has developed another bridging implementation agreement called LAN Emulation (LANE). LANE relies on a LAN Emulation Server (LES), which performs MAC-to-ATM address resolution; a Broadcast and Unknown Server (BUS), which performs data broadcast; and an optional LAN Emulation Configuration Server (LECS), which performs initialization and configuration.

FIG. 2 shows the above-described example in a LANE environment. LAN 101 and LAN 103 constitute two different emulated LANs (ELANs). LAN 101 is served by LES 201 and BUS-203 while LAN 103 is served by LES 211 and BUS 213. As in the previous example, host 111-1 transmits a data packet with the MAC address of host 113-2. All stations on Ethernet 111-4, and consequently, ATM-attached bridge 111-5, receive the data packet. Bridge 111-5 either a) contains within its own information the ATM address of host 113-2, or, b) if not, it establishes an ATM connection to LES 201 and transmits thereto a so-called "LE_ARP_REQUEST" message to obtain the ATM address of host 113-2. The LE_ARP_REQUEST message is defined in the ATM Forum's LAN Emulation Over ATM Specifications, Version 1.0, the contents of which are well known by those skilled in the art and which are incorporated herein by reference. The specifications defined in the ATM Forum's LAN Emulation Over ATM Specifications, Version 1.0 will be referred to herein as the LAN Emulation User-to-Network Interface (LUNI).

If LES 201 contains within its own address cache the requested address, it responds by transmitting it to bridge 111-5. Bridge 111-5 then builds an ATM connection to bridge 113-5, and transmits thereto the data packet. Otherwise, LES 201 broadcasts an LE_ARP_REQUEST message requesting the ATM address of host 113-2 to all other LAN Emulation Clients (LECs) in sub-ELAN 207, namely bridge 113-5, hosts 115-1 and 115-2. Generally speaking, LAN emulation clients (LEC) are end-stations or bridges that are directly connected to an ATM network. Bridge 113-5 responds to LES 201 with its own ATM address, because it is serving host 113-2, the host whose MAC address has been specified. Here, bridge 113-5 is called a "proxy-LEC", since it represents multiple end-point addresses, e.g., the MAC addresses of hosts 113-1, 113-2, and 113-3. For a more detailed description of the definitions of a LEC and a proxy-LEC reference may be made to the LUNI.

Broadcast data packets generated on legacy LANs, such as a so-called "ARP_Requests" to resolve a layer-3 address into a layer-2 address, are forwarded to a BUS, which in turn broadcasts them to all LECs. "ARP_Requests" are defined in Bell Communications Research (Bellcore) request for comments (RFC) 826, which is incorporated herein by reference. Also, data packets are sent to a BUS for forwarding to the destination LEC until a direct ATM connection is established to the target address within the ELAN.

Similar to the previous example, the communications between two ELANs is done via external router 151. Bridge 117-5 receives a data packet from host 117-1 to the MAC address of router 151. Either bridge 117-5 has the ATM address of router 151, or it requests the address from LES 211. After obtaining the ATM address of router 151, bridge 117-5 builds an ATM connection thereto, and transmits the data packet over the connection.

Either router 151 has the ATM address of bridge 111-5, or it requests the address from LES 201. Router 151 then builds an ATM connection to bridge 111-5, and sends thereto the data packet. The data packet will be received by bridge 111-5 and passed to hosts 111-1, 111-2 and 111-3. Thus, disadvantageously, all inter-ELAN packets must pass through router 151, which may become a communications bottleneck.

The existing LANE methods work effectively only for small scale local networks. The LANE solution requires one LES and BUS per ELAN, and one ELAN per subnet. If an ELAN becomes large, there will be a large number of connections between the LECs and their LESs and BUSs. For example, when there are N (e.g., 3,000) LECs in an ELAN, then there will be at least 2N ATM connections connecting all LECs in the ELAN to the respective LES and BUS, assuming 1) a single bi-directional control connection per LEC to LES, and 2) a single bi-directional data connection per LEC to BUS. Furthermore, there could be as many as $N^2$ direct connections between LECs for unicast data communications, but these connections are Switched Virtual Connections (SVCs) and will be built only when there is data communications between a pair of LECs. However, the 2N connections connecting all LECs in the ELAN to the respective LES and BUS are permanent connections, existing as long as the LECs are participating in the ELAN.

Such a large number of permanent connections will rapidly exhaust the connection and switching resources in an ATM network as the ELAN grows in size. Also, such ATM connections are very expensive when the LECs are geographically separate and most of the 2N links traverse a Wide Area Network (WAN) to connect to a LES and a BUS. Also, broadcast messages transmitted between a BUS and all N LECs result in a degradation of network performance when they are transmitted across the WAN, as they traverse several ATM switches along the path for each broadcast packet. Other significant limitations of the single LES and BUS ELAN solution are 1) lack of reliability in case a LES or a BUS fails, and 2) performance degradation and capacity resource limitations within the LES and the BUS when supporting a large number of LECs. It is desirable to 1) reduce the cost of such 2N client-to-server connections, 2) reduce the required switching and facility resources in an ATM network, 3) improve the reliability of the ELAN service components, and 4) reduce the computation burden of the single LES and BUS in a large scale ELAN.

SUMMARY OF THE INVENTION

In accordance with the principles of the invention, the foregoing problems can be overcome by employing multiple LESs and BUSs to serve an ELAN. This can be done by assigning the LECs of a large ELAN into sub-ELANs, each of which includes several LECs of the ELAN, e.g., those that are geographically proximate to each other. Each such sub-ELAN also includes its own separate LES, and BUS when one is required, so that each sub-ELAN is also a stand-alone ELAN. By interconnecting the LES and BUS of the sub-ELANs, in accordance with the principles of the invention, a large single ELAN that combines the sub-ELANs is created. The LESs/BUSs can be interconnected in any pattern that allows each LES/BUS to communicate with each other LES/BUS via at least one path, which need not be direct.

In accordance with the principles of the invention, a proxy-LEC interface in one sub-ELAN is used to communicate information from that sub-ELAN to the LES/BUS of another sub-ELAN. In accordance with an aspect of the invention, this is achieved by employing interconnectable LESs and BUSs to serve each of the sub-ELANs that are joined together into a single ELAN. To form the ELAN, the LES/BUS of each sub-ELAN is connected to at least the respective LES/BUS that serves another sub-ELAN using, for example, Asynchronous Transfer Mode (ATM) connections, such that the LES/BUS of the two sub-ELANs mutually and symmetrically connect to each other as proxy-LECs.

When a LES/BUS needs to connect with more than one other LES/BUS, multiple proxy-LECs are used to achieve the LES-LES and BUS-BUS interconnections. The LES/BUS presents a proxy-LEC interface to the sub-ELAN of each of the different LESs/BUSs to which it is connected. Each LES/BUS will assign a unique LEC-ID to the proxy-LEC interface of each other LES/BUS that joins its sub-ELAN.

When a LES/BUS within a sub-ELAN broadcasts a packet within a sub-ELAN, at least all proxy-LECs of the sub-ELAN receive the packet. Thus, any LES/BUS that has joined with that sub-ELAN as a proxy-LEC also receives the broadcast packet. More particularly, the proxy-LEC interface receives the packet and relays the packet to it's attached LES/BUS. In turn, the attached LES/BUS broadcasts the packet to all the LECs within the sub-ELAN it serves. Consequently, all the other LESs/BUSs attached to that LES/BUS as a proxy-LEC receive the packet, allowing it to be forwarded to LECs in other sub-ELANs. Thus, a packet can propagate from the sub-ELAN in which it was created to all other sub-ELANs in the ELAN.

Two problems in sequentially propagating the packets from a LES/BUS to a proxy-LEC are 1) looping, and 2) multiple copies of packets.

Looping occurs when a packet received by a LES/BUS is sent back to the originating LES/BUS. To avoid looping, each LES/BUS must a) determine from which LES/BUS a packet is received, and b) not forward the packet to that LES/BUS again. Alternatively, the receiving LES/BUS must filter out those packets that it itself originally created.

Multiple copies of a frame are received by a LES/BUS when they are forwarded from several LESs/BUSs at the same time, or with a time lag due to a sequential forwarding. Multiple copies are prevented from propagating in the network, in accordance with an aspect of the invention, by each LES/BUS implementing a pre-determined forwarding scheme that describes which proxy-LECs a packet can be forwarded to when it is received from a certain LES/BUS or a LEC within the sub-ELAN. In accordance with an aspect of the invention, the forwarding rules (policies) may be maintained within a LAN emulation configuration server (LECS) and downloaded into each LES/BUS in the ELAN at the time the LES/BUS builds a connection with the LECS to configure itself.

The topology of LES/BUS connectivity may be 1) contained within the LECS and 2) down-loaded to each LES/BUS, in accordance with an aspect of this invention. The topology information for each LES/BUS contains at least the addresses of other LESs to which that LES/BUS is to connect to via a proxy-LEC interface, in accordance with an aspect of the invention. Also, the topology information may contain the range of LEC-IDs that can be assigned to LECs in the sub-ELAN served by a LES/BUS. The LEC-ID is a unique identifier within an ELAN, which is assigned by a LES to a LEC at the time the LEC joins the sub-ELAN served by the LES.

In accordance with an aspect of the invention, when a LES/BUS or a connection fails, the LECS may reconfigure the topology of the ELAN, by transmitting a new connection topology that excludes the failed LES/BUS or connection. In accordance with another aspect of the invention, the LECS may also update it's LEC to LES assignment mapping so that the LECs in the impaired sub-ELAN can be served by an existing operational LES/BUS. The forwarding information is also changed when the server-to-server topology changes, e.g., due to 1) the addition of new servers, 2) the deletion of servers, or 3) LES/BUS failure, in accordance with an aspect of the invention. When the forwarding information changes, the LECSs must inform all the affected LESs/BUSs by sending the updated forwarding scheme.

The interconnected LES/BUS arrangement has the following advantages: 1) the cost of connections between the LECs and their LES/BUS is reduced since it takes shorter connections to connect each LEC to a LES and a BUS within its own geographic vicinity; 2) all connections are local, except possibly connections that tie the LESs/BUSs together; 3) the LECs in any sub-ELAN can communicate with the LECs in the same, or any other sub-ELAN directly, i.e., without having to use a router at all, since all the sub-ELANs are interconnected to form an ELAN; 4) performance and capacity burdens that previously fell on a single LES/BUS are shared among several LESs/BUSs; and 5) ELAN service reliability is significantly improved in the event of a LES/BUS failure, since the failure affects only the portion of the network that is served by the failed LES/BUS.

In one embodiment of the invention, each LES/BUS connects directly to another LES/BUS as a proxy-LEC of the other's sub-ELAN. This requires a LEC/LES/BUS triplet to be implemented, instead of the prior art LES/BUS defined in LUNI. The ATM control Virtual Channel Connection (VCC) between a proxy-LEC and a LES is used to forward control packets from the LES to the remote LES attached to that proxy-LEC. Similarly, the created ATM multicast data VCC between the proxy-LEC and a BUS is used to forward multicast data packets from the BUS to the remote BUS attached to the proxy-LEC. The forwarding of a packet from a LEC, which is part of a sub-ELAN, to its LES/BUS complies with LUNI. The server-to-server (LES/BUS-to-LES/BUS) forwarding of packets also uses LUNI messages, since the server-to-server connectivity is achieved by a server presenting itself to the other server as a proxy-LEC served by that LES/BUS.

The connectable proxy-LEC, LES and BUS triplet includes 1) one or more proxy-LECs, one per connection of the attached LES/BUS to a remote LES/BUS, 2) one LES, and 3) one or more BUSs, each BUS designated by the LES to serve a group of LECs in the sub-ELAN. Multiple BUSs are possible since a LEC configures itself, per LUNI, by connecting to the LECS to obtain the address of the LES serving it. After a LEC completes joining with the LES, it learns the address of its BUS from the LES using the address resolution mechanism defined by LUNI. As a result, the LES may allocate different BUSs to groups of LECs in an ELAN to distribute the load among many BUSs.

DETAILED DESCRIPTION

Figure 1:
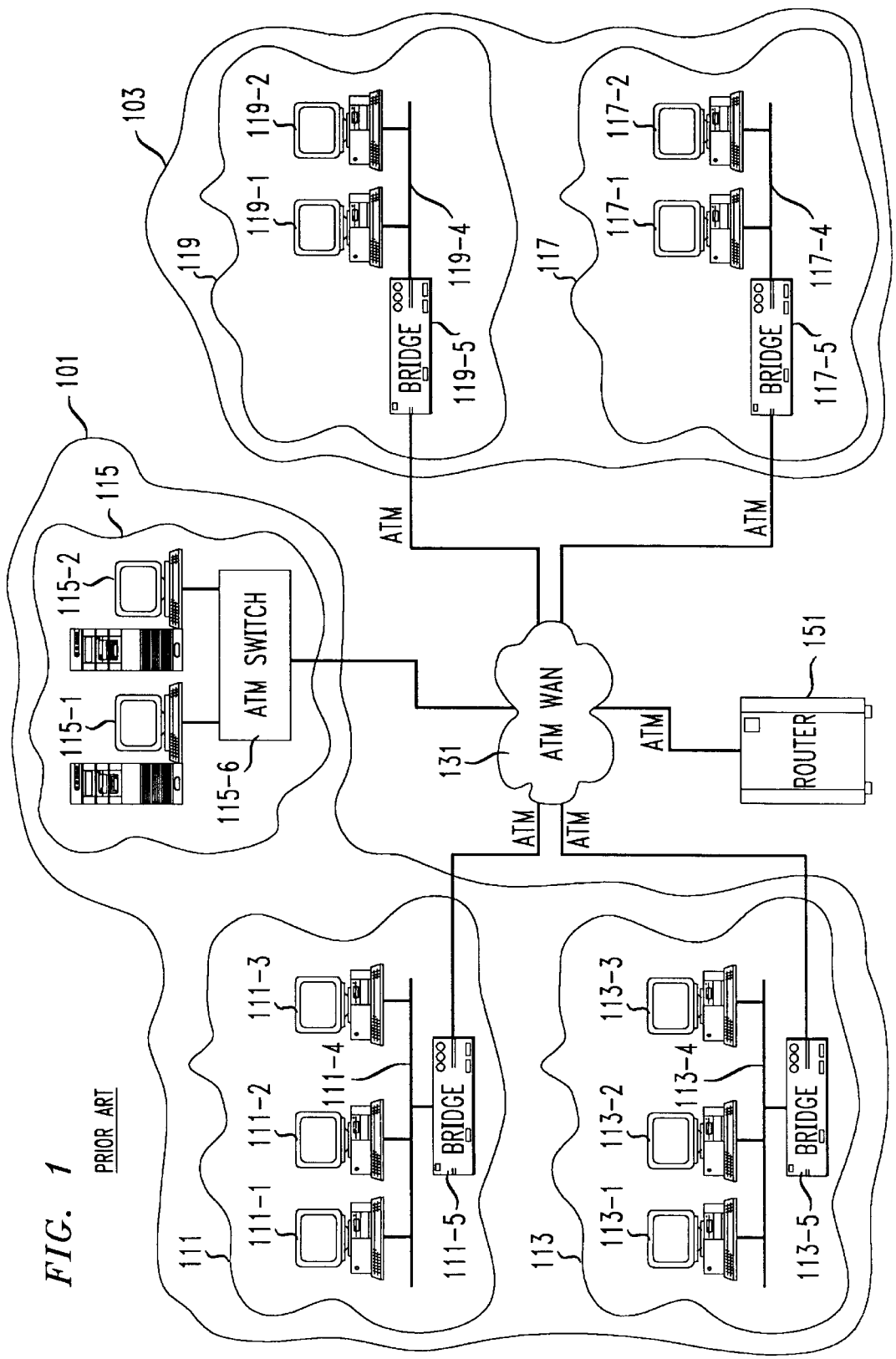
FIG. 1 shows two small prior art networks, each representing a different logical subnet at layer-3.
Figure 2:
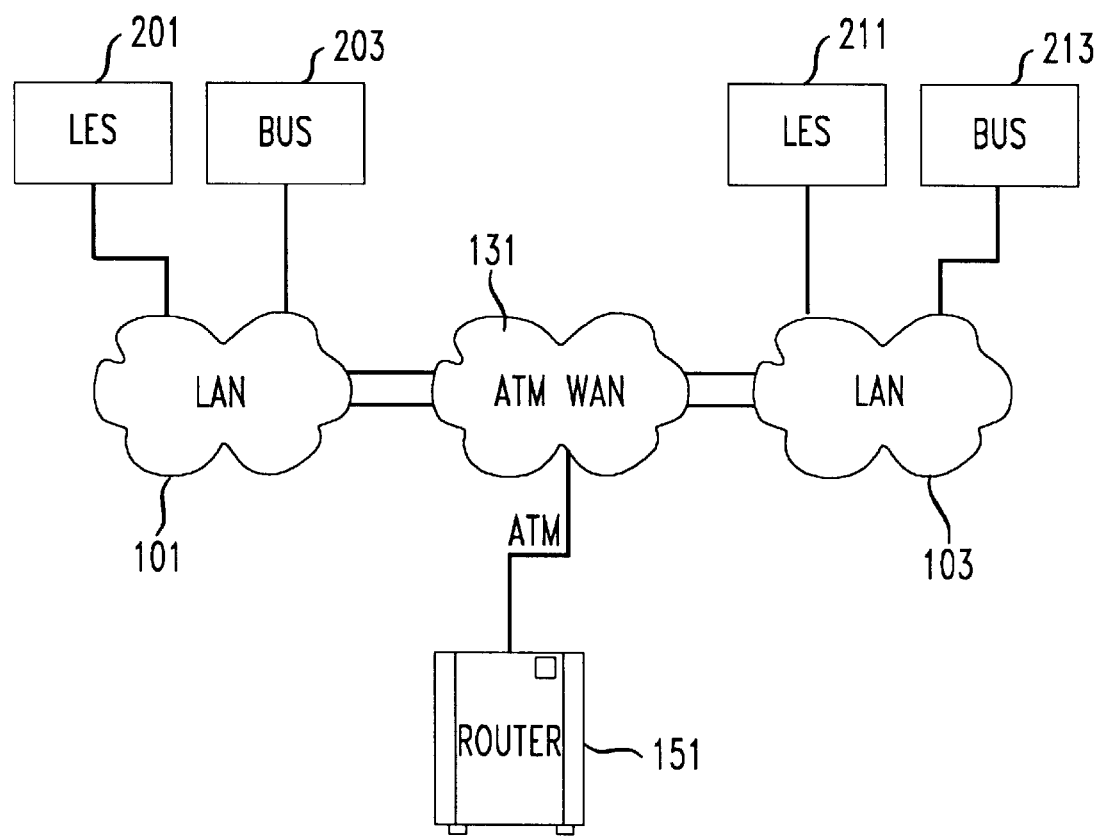
FIG. 2 shows prior art LAN emulation in which the LANs of FIG. 1 are served by various servers, i.e., LES and BUS.
Figure 3:
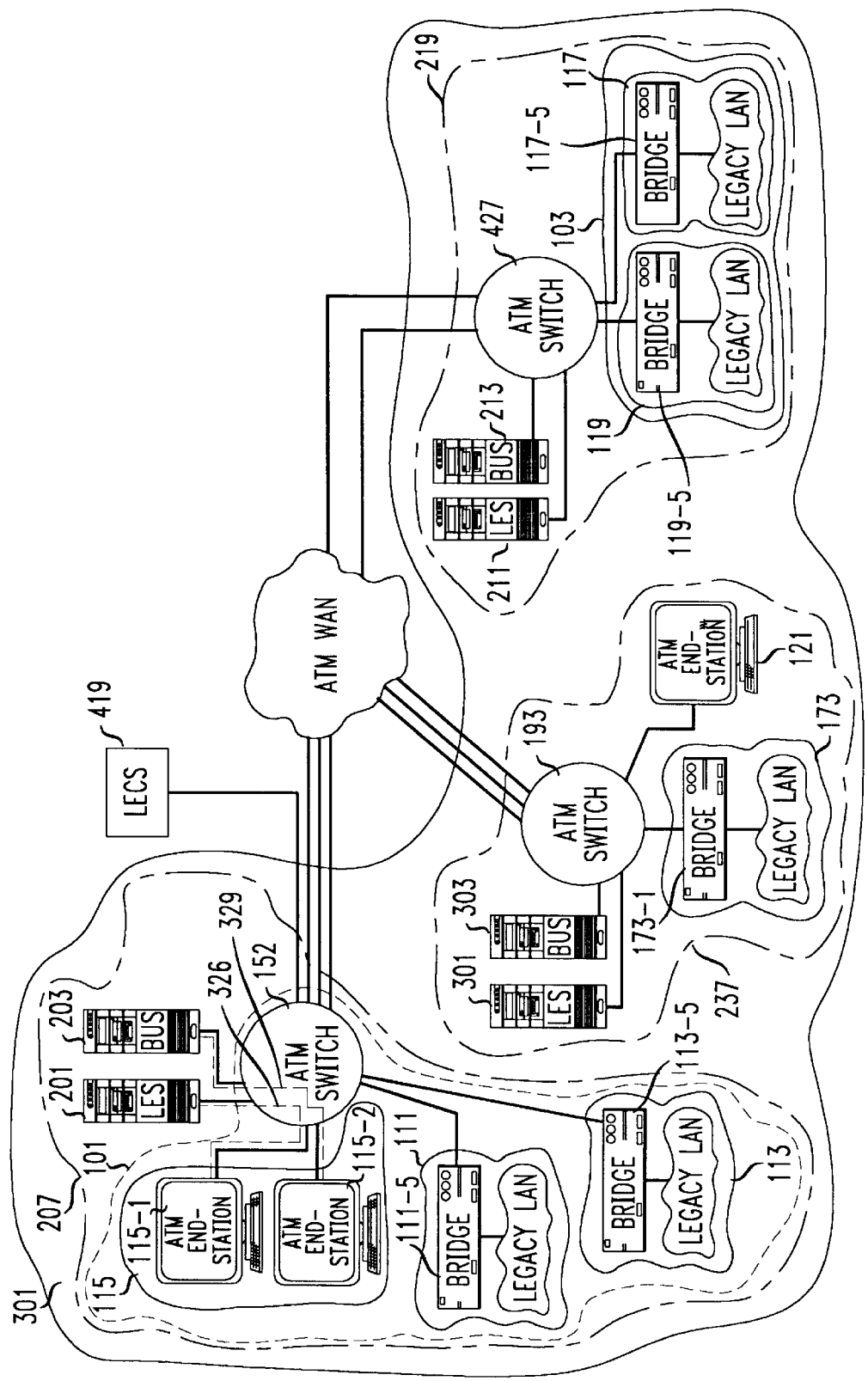
FIG. 3 shows the physical network diagram for interconnecting three sub-ELANs via their respective interconnectable LESs and BUSs, in accordance with the principles of the invention.

FIG. 3 shows an exemplary embodiment of the invention in which the LAN emulation server (LES) and broadcast an unknown server (BUS) of each of sub-ELANs 207, 219, and 237 are interconnected using a loop topology to form ELAN 301, in accordance with the principles of the invention.

Sub-ELAN 207 includes network 101, LES 201, and BUS 203. LES 201 and BUS 203 may be collocated and they are connected to ATM switch 152. Sub-ELAN 219 includes network 103 and its associated servers LES 211 and BUS 213, which may be collocated and are connected to ATM switch 427. Sub-ELAN 237 includes bridge and legacy LAN 173, ATM end-station 121, ATM switch 193, and associated servers LES 301 and BUS 303, which may be collocated and are connected to ATM switch 193.

ATM switches 152, 193 and 427 are fully interconnected via network facilities using physical interfaces such as Synchronous Optical Network (SONET) or Synchronous Digital Hierarchy (SDH).

LES 201/BUS 203 connect to all the LECs in sub-ELAN 207 via ATM virtual channel connections (VCCs). The LECs of sub-ELAN 207 are ATM end-stations 115-1 and 115-2, ATM bridge 111-5 and 113-1. ATM end station 115-1 connects to LES 201 using ATM connection 326 which traverses ATM switch 152. Also, ATM end station 115-2 connects to BUS 203 using ATM connection 329, which also traverses ATM switch 152.

LES 211/BUS 213 connect to all LECs in sub-ELAN 219 via ATM VCCs. Such LECs in sub-ELAN 219 are ATM bridges 119-5 and 117-5. LES 211/BUS 213 connect to bridges 119-5 and 117-5 via ATM connections through ATM switch 427. LES 301/BUS 303 connect to the LECs of sub-ELAN 237, which include ATM end station 121 and ATM bridge 173-1, via ATM connections through ATM switch 193.

LAN emulation configuration server (LECS) 419 is connected to ATM switch 152. LECS 419 is interconnected with LESs 201, 211, and 301 via permanent or switched virtual ATM connections. Each LES of the ELAN establishes its ATM connection to LECS 419 at the time of initialization. The connections are permanently maintained so that LECS 419 can communicate with each LES, and may be routed through the proxy-LEC interface of the LES.

Each LES obtains the ATM address of its LECS using one of the following methods: 1) the LES obtains the address of LECS from the ATM switch to which it connects, 2) the LECS is located at an address preprogrammed to be known to each LES, or 3) the LECS address is a well-known address.

LECS 419 initially uses it's ATM connections with LESs 201, 211, and 301 to supply LES-configuration information. After initialization is complete, LECS 419 uses these connections to 1) monitor the status of each LES, and 2) send updated information for re-initialization in the event of topological changes in the servers such as a) addition of a new server, or b) failure of a server.

LECS 419 contains all the information necessary to interconnect sub-ELANs 207, 219 and 237 by interconnecting their LESs/BUSs according to a specific connection topology. This topology can be determined by a human operator, and/or may be calculated by LECS 419 to meet predetermined optimal connection criteria with respect to particular characteristics of the network, such as the geographical locations of each LES or the ATM switches they connect to. In addition, LECS 419 contains all the functionality necessary to support configuration of a LEC in a sub-ELAN, e.g., as specified by LUNI. Such information includes the assignment of LES addresses to LECs and supplying information, such as the ELAN names, types, and maximum packet (frame) sizes, to LECs in each sub-ELAN. The LECS-LEC interaction is well defined by LUNI, and hence will not be described here.

In accordance with an aspect of the invention, LECS 419 also contains server-to-server connectivity topology information. Such topology information includes 1) the ATM address of each LES serving a sub-ELAN within the ELAN, 2) the availability state of each LES, and 3) a topology that specifies the connectivity between the LESs. The availability state indicates whether the LES is operational or unoperational. The LES ATM addresses could be provided to LECS 419 by a human operator or via an electronic means, such as a network management console. The server-to-server connectivity topology can be determined by LECS 419 or supplied by a human operator. Not every LES/BUS must be connected with every other LES/BUS pair. A connection topology which allows at least one connected path between all LES/BUS pairs is sufficient. Exemplary topologies include 1) mesh, 2) tree, 3) loop, 4) star, or 5) an arbitrary pattern.

LECS 419 may be able to determine an optimal topology for interconnecting the operational LESs. If one of the LESs in the network fails, LECS 419 detects this failure, since it is connected to each LES in the network. If LECS 419 detects a failure, it sets the availability state of the failed LES to "unoperational". LECS 419 then determines a new network topology that takes into account the absence of the failed LES. This new topology is selected to ensure that the rest of the network is only minimally disrupted due to the failure. The new topology is called a "detour" server-to-server connectivity topology. LECS 419 can transmit the initial server-to-server connectivity topology to each LES, as well as topology updates when it is necessary to change the server connectivity topology.

LECS 419 also determines a forwarding policy for each server-to-server connection in the ELAN. A forwarding policy is required 1) to prevent packets from looping between servers, and 2) to prevent multiple copies of a packet to propagate in the ELAN. The particular forwarding policy employed depends on the chosen server connectivity topology. The forwarding policy indicates how each server in the network is to forward a packet it received to another server connected to it. Whether a packet is forwarded typically depends on whether the packet is received from one of the LECs in the sub-ELAN, or another LES in the ELAN LECS 419 determines the forwarding policy and sends the relevant portions of the forwarding policy to each LES a) at the time LES initializes itself with the LECS, and b) whenever there is a topological change in the servers of the ELAN, so that the forwarding policy is always correct for the current topology. An exemplary default forwarding policy used by a LES that does not receive a forwarding policy from LECS 419, is to forward all messages it receives from a LES to all other LESs it is connected to.

In accordance with an aspect of the invention, LES 201, 211, and 311 each establishes a connection to LECS 419 over which to receive configuration information. Each LES sends a message over the connection to the LECS that contains the LES ATM address. In response, LECS 419 transmits to the sending LES at least the following information: 1) ATM addresses of all other LESs for each LES to connect to; and 2) forwarding information pertinent to that LES, which indicates which server-to-server connections are used to forward messages received a) on each server-server connection or b) from a LEC in the sub-ELAN. Optionally, the LECS may also supply the permissible range of LEC-IDs usable by the LES for it's LECs in the sub-ELAN. Upon receipt of the server-to-server connectivity topology from LECS 419, each LES in the network initiates the connectivity to other servers. The optional portion of a LUNI "LE_CONFIGURE_RESPONSE" message may be used to carry the configuration information.

When LES receives the LEC-IDs from LECS 419, it assigns only these LEC-IDs to the LECs that it serves. The LEC-ID assignment occurs during the Join process between a LEC and LES, as described by LUNI.

An exemplary server-to-server connectivity topology table is depicted in Table 1 for the network of FIG. 3. Each row of the table indicates a server-to-server connection by listing the ATM addresses of the servers at each end of the connection. Note that each LES need know only those rows of the Table 1 that indicate the particular LESs to which it must establish an ATM connection.

TABLE 1

|         |         |
|---------|---------|
| LES 211 | LES 201 |
| LES 211 | LES 301 |
| LES 201 | LES 211 |
| LES 201 | LES 301 |
| LES 301 | LES 211 |
| LES 301 | LES 201 |

The forwarding policy for a LES/BUS is best explained using a forwarding matrix per LES. Each matrix entry [ij] indicates whether a message received from the entity described on the first column of row-i is forwarded to the entity described on the first row of column j. A simple forwarding matrix for LES 201, LES 211, and LES 301 are shown in Tables 2a, 2b, and 2c.

TABLE 2a

|  | LES-211 | LES-301 |
|---|---|---|
| LEC in sub-ELAN 207 | x | x |
| LES-211 |  |  |
| LES-301 |  |  |

TABLE 2b

|  | LES-201 | LES-301 |
|---|---|---|
| LEC in sub-ELAN 219 | x | x |
| LES-201 |  |  |
| LES-301 |  |  |

TABLE 2c

|  | LES-211 | LES-201 |
|---|---|---|
| LEC in sub-ELAN 237 | x | x |
| LES-211 |  |  |
| LES-201 |  |  |

Table 2a is interpreted as follows: according to row-1, when a message is received from a LEC in sub-ELAN 207, LES-201 must forward it to LES-211 and LES-301. These entries are indicated with "x" at the appropriate row-column position. According to row-2, when a messages is received from LES-211, LES-201 must not forward it to any other LES. Similarly, according to row-3, when a messages is received from LES-311, LES-201 must not forward it to any other LES. This forwarding policy prevents generation of multiple copies of the messages. One can easily determine other forwarding policies, e.g., using a minimal spanning tree, that can achieve the same results with different forwarding sequences.

Although the embodiment of FIG. 3 describes a loop connectivity between servers, other connection topologies, such as a tree, star, mesh or arbitrary topology, can be implemented using the same principles.

Another fundamental aspect of the invention is how a LES/BUS pair achieve connectivity with each other using a proxy-LEC interface once each LES receives the topology information from LECS 419

Figure 4:
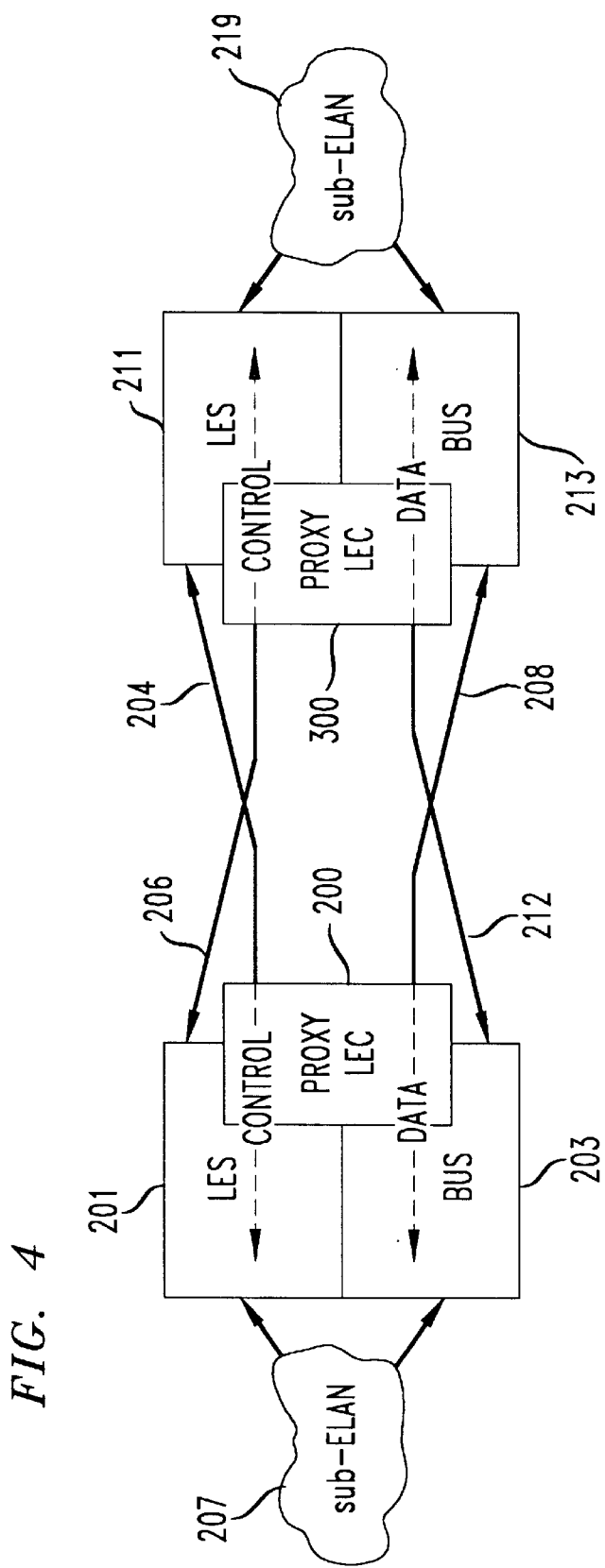
FIG. 4 shows a simplified diagram in which an interconnectable LES and BUS are arranged to interconnect the two sub-ELANs of FIG. 3, in accordance with the principles of the invention.

A proxy-LEC, LES and BUS triplet can be implemented in a variety of ways: 1) The LES/BUS/proxy-LEC are all part of the same physical system, as shown in FIG. 4. This system can be, for example, an ATM switch or an ATM attached workstation. 2) The LES/BUS are on the same physical system but the proxy-LEC is part of a separate server attached to the LES/BUS. 3) The LES, BUS, and proxy-LEC are all on different physical systems, but the proxy-LEC connects to both LES and BUS through a local interface. Note that there can be more than one BUS or proxy-LEC per LES, but only a single LES per sub-ELAN is required. Although FIG. 3 illustrates the LES and BUS on different physical systems for the sake of simplicity of illustration, FIG. 4 shows the proxy-LEC, LES and BUS as being on the same physical system.

A simple scenario helps illustrate how two interconnected servers forward messages to each other. FIG. 4 shows another view of ELANs 207 and 219 of FIG. 3, which are interconnected by interconnecting a) LES 201 and LES 211, and b) BUS 203 and BUS 213. In a particular embodiment of the invention, a LES, e.g., LES 201, is able to build a bi-directional point-to-point control direct Virtual Channel Connection (VCC) 204 to LES 211 and present itself as proxy-LEC 200 to LES 211 by completing the LANE "Join" process. LES 211 may optionally wish to establish a point-to-multipoint control distribute VCC in the reverse direction to send broadcast control frames to proxy-LEC 200, or it may choose to use VCC 204 in the reverse direction for the same purpose. Such control connection establishments are described in LUNI.

After LES 201 completes joining with LES 211, by building control VCC 204 and presenting itself thereto as proxy-LEC 200, BUS 203 must join with BUS 213 by establishing a multicast data VCC through proxy-LEC 200 as well. In order for proxy-LEC 200 to connect to BUS 213, it needs to know BUS 213's ATM address. Proxy-LEC 200 obtains the ATM address of BUS 213 by sending to LES 211, on VCC 204, an LE_ARP_REQUEST message that requests the ATM address corresponding to the "all-ones" broadcast address. LES 211 returns the ATM address of BUS 213 in an LE_ARP_RESPONSE to proxy-LEC 200 on VCC 204. Upon receipt of the ATM address of BUS 213, proxy-LEC 200 establishes bidirectional point-to-point multicast data VCC 208, to BUS 213. BUS 213 may use the reverse direction of 208 to forward broadcast data packets or, optionally, BUS 213 may choose to establish a point-to-multipoint multicast forward VCC to proxy-LEC 200. Connection 208 is used by BUS 203 to forward data packets to BUS 213 via proxy-LEC 200. It is also used by BUS 213 to broadcast data packets received from other clients in sub-ELAN 219 to proxy-LEC 200, and thus to BUS 203. Proxy-LEC 200 successfully completes its join with sub-ELAN 219 upon establishing connections 204 and 208.

Likewise, LES 211 and BUS 213 join with sub-ELAN 207, by presenting themselves as proxy-LEC 300 to LES 201 and BUS 203 of sub-ELAN 207. Proxy-LEC 300, which is attached to LES 211 and BUS 213, builds bi-directional point-to-point control direct VCC 206 to LES 201 and presents itself as a proxy-LEC to LES 201 by completing the LANE "Join" process. LES 201 forwards control packets to proxy-LEC 300 over VCC 206, and in turn those control packets are received by LES 211 attached to proxy-LEC 300. In turn, LES 201 may optionally wish to establish a point-to-multipoint control distribute VCC to send broadcast control frames to proxy-LEC 300, or it may choose to use VCC 206 in the reverse direction for the same purpose. The same process described above is employed for BUS 213 to connect itself to BUS 203 via proxy-LEC 300, resulting in multicast send VCC 212.

Note that when LES 201 forwards a control packet to its LECs in sub-ELAN 207, proxy-LEC 300, and thereby LES 211, also receive that control packet through VCC 206. Similarly, when LES 211 forwards a control packet to its LECs in sub-ELAN 219, proxy-LEC 200, and thereby LES 201, receive it through VCC 204. Each remote LES can forward the received control packet to all its local LECs in turn. Advantageously, this two-stage forwarding process allows all LECs in the ELAN to receive control packets that are generated in any sub-ELAN. Also note that connections 204 and 206 can be used as the forwarding paths from LES to proxy-LEC, and from proxy-LEC to LES.

Symmetric connectivity of BUSs 203 and 213 results in 1) BUS 203 becoming part of ELAN 219 as proxy-LEC 200, and in turn, 2) BUS 213 becoming part of sub-ELAN 207 as a proxy-LEC 300. Note that when BUS 203 forwards a multicast data packet to its LECs in sub-ELAN 207, proxy-LEC 300, and thereby BUS 213, also receive that multicast data packet via connection 212. In turn, BUS 213 can forward that multicast data packet to its LECs in sub-ELAN 219 (except proxy-LEC 200, to avoid looping). Similarly, when BUS 213 forwards a multicast data packet to its LECs in sub-ELAN 219, proxy-LEC 200, and thereby BUS 203, receive it through connection 208. In turn, BUS 203 can forward that multicast data packet to its LECs in sub-ELAN 207 (except proxy-LEC 300, to avoid looping). This two-stage forwarding process allows all LECs in the ELAN to receive multicast data packets generated in one sub-ELAN. Also note that connections 208 and 212 are the forwarding paths for data packets from BUS to proxy-LEC, and in the reverse direction. Although BUSs are designed to receive and forward broadcast data packets, they can also forward a "flush" packet which is a control packet defined in LUNI.

Thus, using proxy-LEC interfaces and the set of messages defined by LUNI, a pair of LESs are symmetrically interconnected to send and receive control packets, while a pair of BUSs are interconnected to send and receive data packets, in accordance with the principles of the invention.

Figure 5:
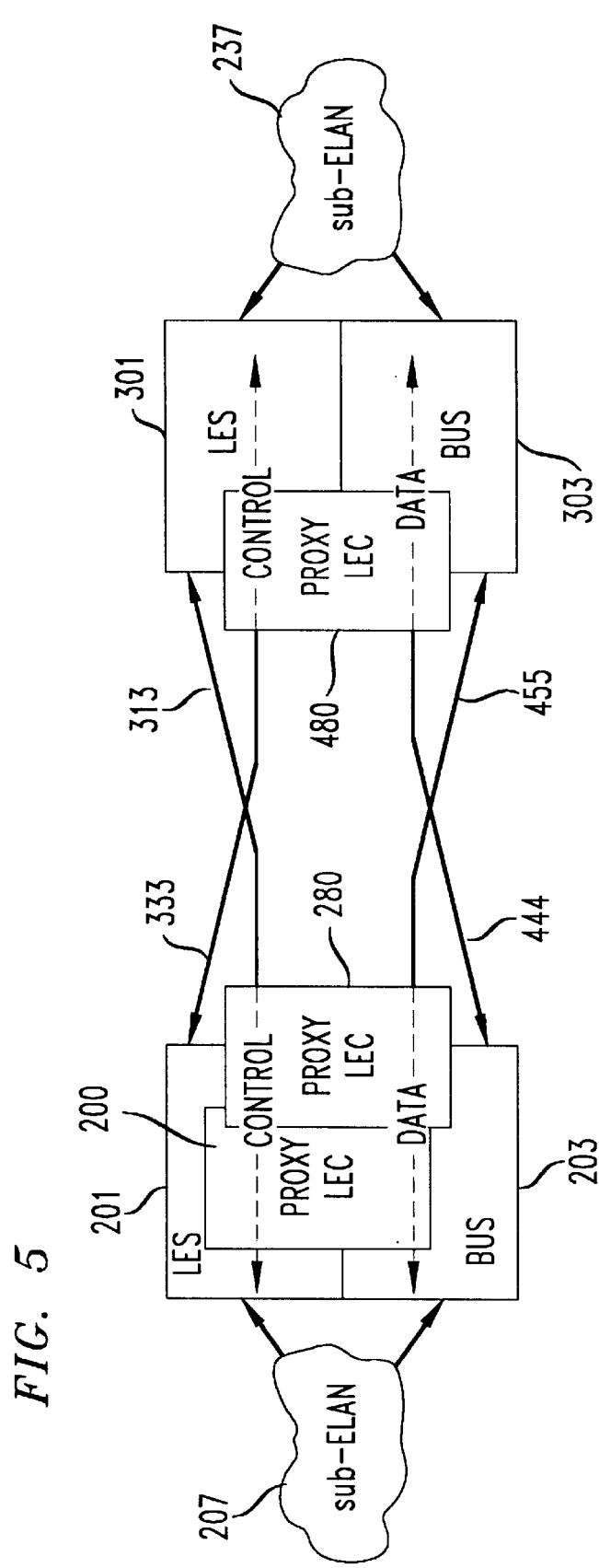
FIG. 5 shows a simplified diagram of the connections between the servers of the different sub-ELANs of FIG. 3.

In accordance with an aspect of the invention, each pairwise connection between LESs/BUSs creates a new pair of proxy-LECs. FIG. 5 shows the connection of LES 201/BUS 203 to LES 301/BUS 303 after the connection of LES 201/BUS 203 to LES 211/BUS 213. Note that LES 301/BUS 303 presents itself as proxy-LEC 480 to LES 201/BUS 203 of sub-ELAN 207. In turn LES 201/BUS 203 presents itself as proxy-LEC 280 to LES 301/BUS 303 of sub-ELAN 237. The process for proxy-LEC 280 and proxy-LEC 480 joining with LES 301/BUS 303 and LES 201/BUS 203 is the same as the process described in FIG. 4 for LES 201/BUS 203 and LES 211/BUS 213. Note that after each server-pair is connected pairwise symmetrically, they can exchange control packets as well as broadcast and multicast data packets.

Figure 6:
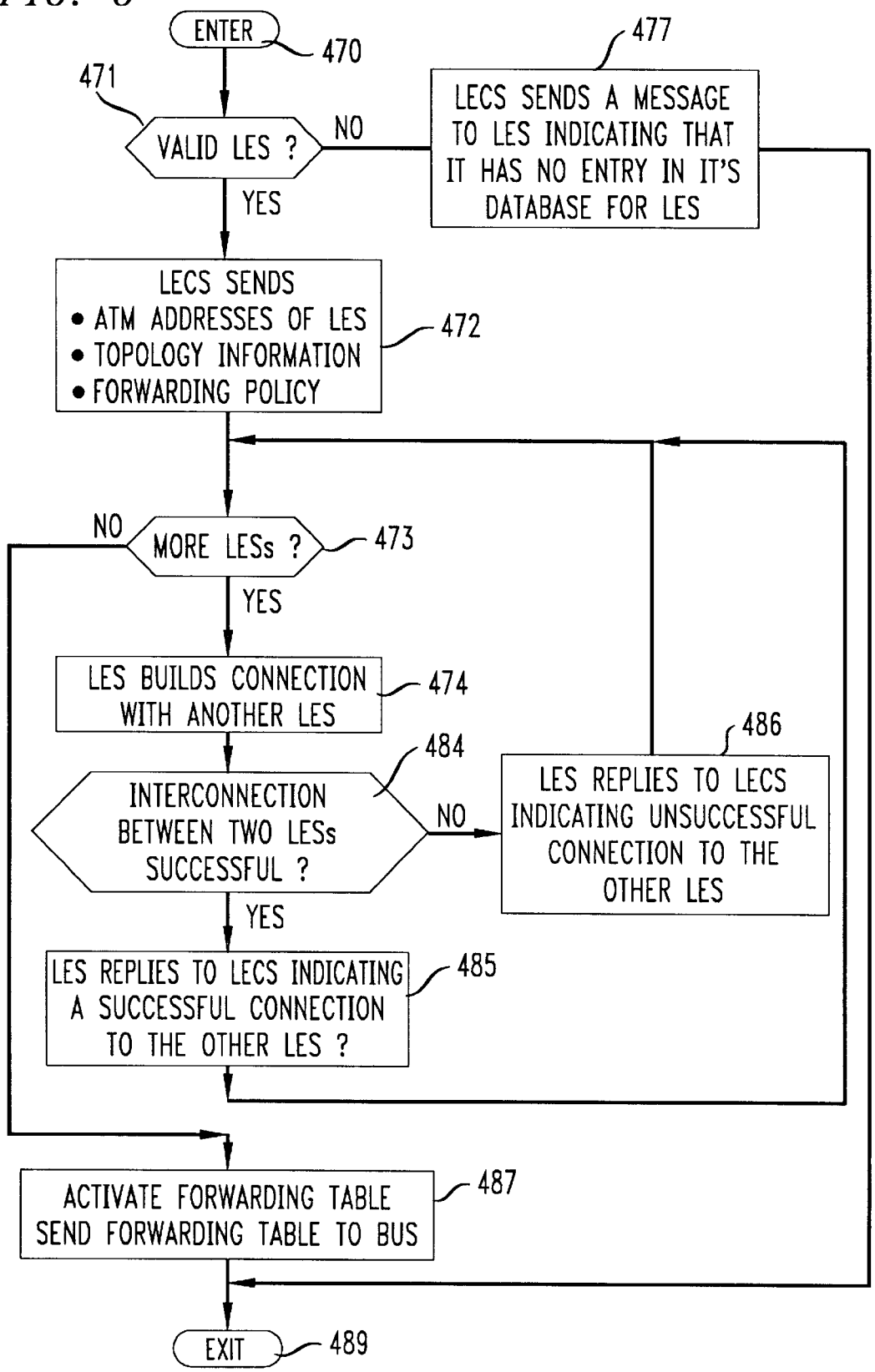
FIGS. 6, 7, and 8 show exemplary processes for processing packets in the system of FIG. 3, in accordance with the principles of the invention.
Figure 7:
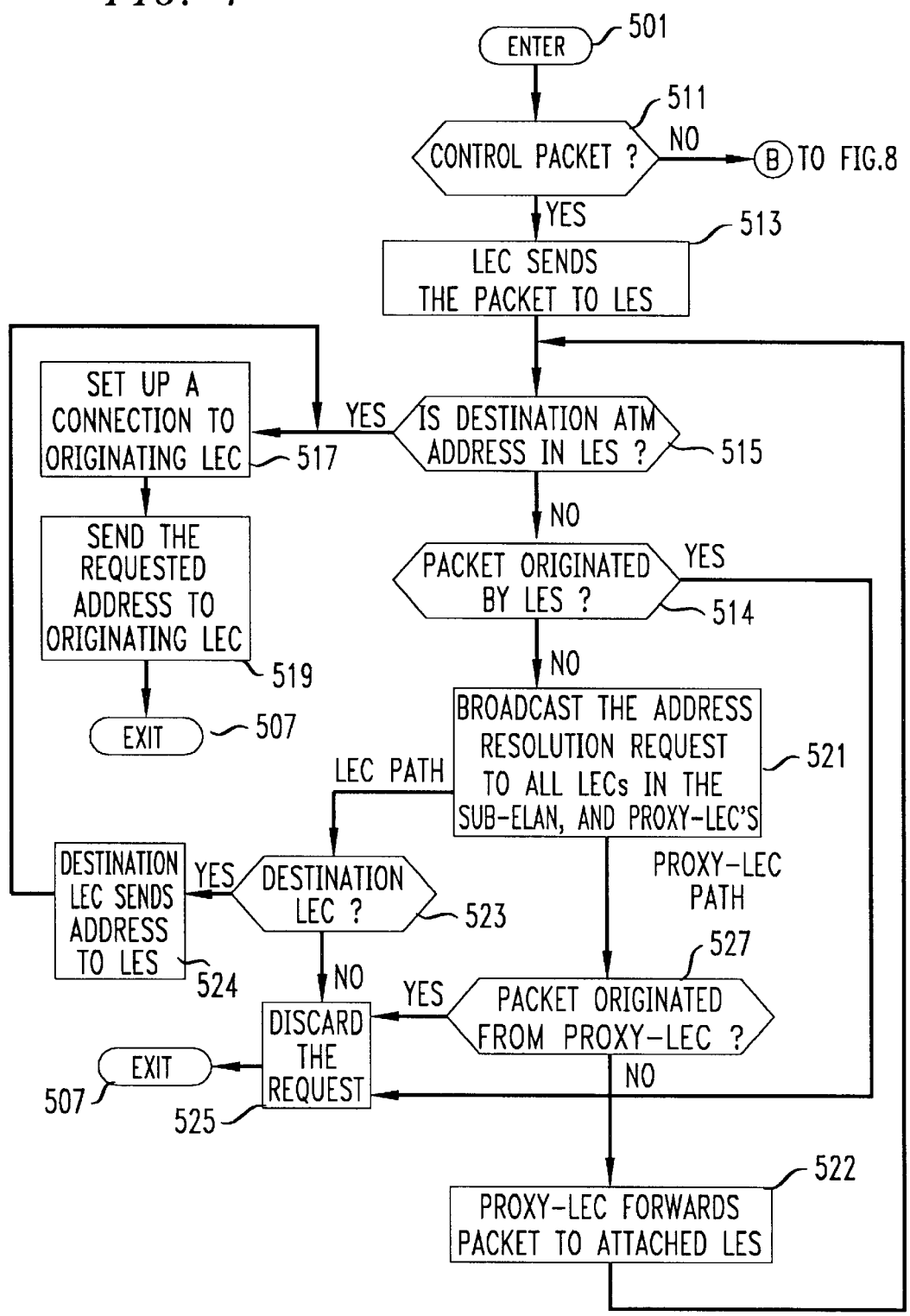
Figure 8:
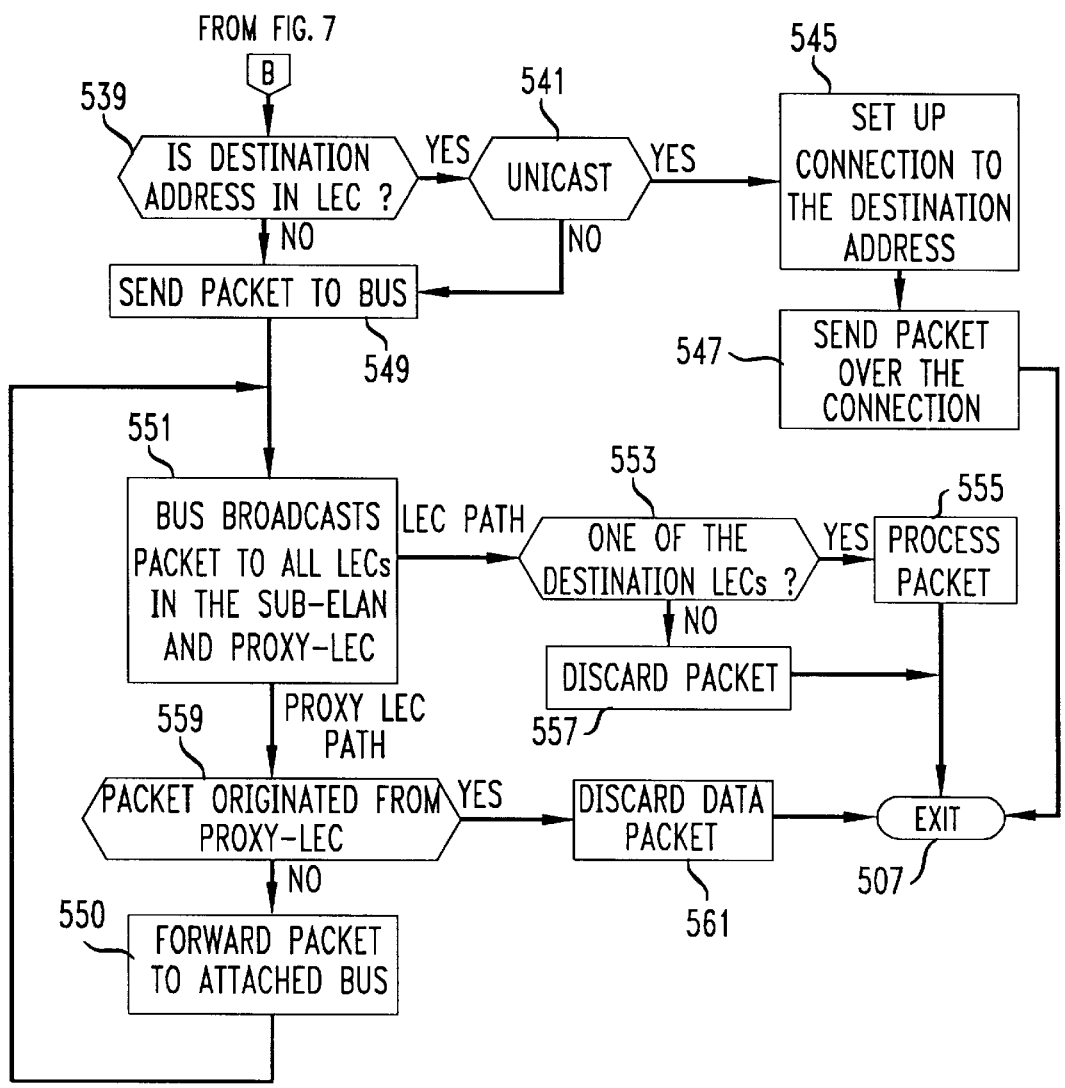

FIGS. 6, 7, and 8, show exemplary processes for configuring a LES by an LECS and processing packets in the system of FIG. 3, including the performing of address resolution and the forwarding of data packets to a specified address, in accordance with the principles of the invention.

FIG. 6 shows the process of configuring a LES by an LECS, which is entered in step 470 when a LES, e.g., using its proxy-LEC interface, establishes an ATM connection to an LECS and transmits a message, e.g., a LUNI LE_CONFIGURE_REQUEST message, presenting its ATM address to the LECS and requesting the pertinent LES-configuration information. Next, in conditional branch point 471, the LECS determines if the LES is a valid LES for that ELAN. If the test result in step 471 is NO, indicating that LECS can not find the LES in its database, control passes to step 477, in which the LECS responds to the LES indicating that the request is an invalid request. The process then exits in step 489.

If the test result in step 471 is YES, indicating that the LECS found the address of the LES in its database, control passes to step 472, in which the LECS replies to the LES with the parameters for configuring the LES, e.g., using a LUNI LE_CONFIGURE_RESPONSE message. In particular, the LECS sends 1) the ATM address of each other LES to which the LES must build connections (topology information), 2) the forwarding policy to be employed by the LES, and 3) the LEC-IDs permissible for the LES to assign to the LECs of its own sub-ELAN.

Next, the LES tests to determine, in conditional branch point 473, if there are additional LESs to which the LES must connect itself. If the test result in step 473 is YES, control passes to step 474, in which the LES builds an ATM connection as a proxy-LEC to the first LES indicated in the topology information if such a connection does not already exist. Such a connection may already exist if the first LES has priorly initiated the connection process. Thereafter, in conditional branch point 484, the LES tests to determine if its connection to the first LES has been successfully established. If the test result in step 484 is YES, indicating that the connection has been successfully established, control passes to step 485, in which the LES sends a reply to the LECS indicating that the connection with the first LES is established. Control then passes back to step 473.

If the test result in step 484 is NO, indicating that the connection has not been successfully established, control passes to step 486, in which the LES sends a reply back to LECS indicating that the connection with the first LES was not established. Control then passes back to step 473.

When the LES completes all its connections with the other LESs in the ELAN to which it is to connect according to the LECS supplied topology information, the test result in step 473 will be NO. At such time, control passes to step 483, in which the LES sends the forwarding table to its associated BUS and activates its own forwarding table. The process is exited in step 489. The LES configuration is complete.

FIGS. 7 and 8 illustrate the processing of packets in an ELAN having interconnected servers. The process is entered in step 501, when a LEC in a sub-ELAN has prepared a packet for transmission. Next, conditional branch point 511 tests to determine if the packet is a control packet, such as an address resolution packet. If the test result in step 511 is YES, control passes to step 513, in which the LEC transmits the packet to the LES serving the sub-ELAN. Such control packets are defined in LUNI and include LE_ARP_REQUEST, LE_ARP_RESPONSE, LE_NARP_REQUEST, LE_JOIN_REQUEST, etc. For clarity of exposition, it is assumed that the control packet is an LE_ARP_REQUEST requesting from the LES an ATM address corresponding to a MAC address.

Thereafter, conditional branch point 515 tests to determine if the ATM address of the destination of the packet is found within the LES. If the test result in step 515 is YES, control passes to step 517, in which the LES establishes a connection to the packet-originating LEC, if one does not already exist. Next, in step 519, the LES transmits the requested ATM address to the packet-originating LEC in an LE_ARP_RESPONSE message. The process then exits in step 507. Note that in this instance, steps 517-519 are performed by the LES serving the LEC in a sub-ELAN.

If the test result in step 515 is NO, indicating that the ATM address of the destination is not contained within the LES, the LES tests to determine, in conditional branch point 514, if it itself originated the address resolution request packet. If the test result in step 514 is YES, control passes to 525, in which the LES discards the packet containing the request. The process then exits in step 507.

If the test result in conditional branch point 514 is NO, indicating that the LES is not the originator of the request, control passes to step 521, in which the LES broadcasts an address resolution request to all the LECs in the sub-ELAN and, consequently, to one or more proxy-LECs representing remote LESs. The LES will determine, in step 521, to which proxy-LECs it must forward the packet using the forwarding table, such as Table 2, received from the LECS, in accordance with an aspect of the invention.

In some cases, LES may have the requested ATM address in it's database, but this address may be unreliable or it's aging timer might have expired. In such a case, the LES may know which LEC or proxy-LEC may know the address, and therefore instead of broadcasting the address to all legitimate destinations, it may only send it to the LEC, or proxy-LEC which may know the requested ATM address.

Next, the following process steps are undertaken substantially in parallel by each proxy-LEC representing a remote LES and the other LECs in the sub-ELAN. Each proxy-LEC tests to determine if it originated the packet in conditional branch point 527. If the test result in step 527 is YES, control passes to step 525, and the process continues as described above. If the test result in step 527 is NO, control passes to step 522, in which the proxy-LEC forwards the control packet to its attached LES. Control then passes to step 515 in the LES connected to the proxy-LEC, and the process continues therein as described above.

On receipt of the control packet each non-server-connected LEC in the sub-ELAN tests to determine if it is the destination LEC, in conditional branch point 523. If the test result in conditional branch point 523 is NO, indicating that the LEC is not the destination LEC, control passes to step 525, and the packet including the resolution request is discarded. Control then passes to step 507 and the process is exited.

If the test result in step 523 is YES, indicating that the LEC is the destination LEC, control passes to step 524, in which the LEC sends a packet, including the requested address, to the requester originating the address resolution request. The requester is indicated, for example, by the Source ATM Address field of the request message. The requester can be presented as a LES or the LEC originating the LE_ARP_REQUEST, depending on the implementation. If the originator is a LES, then it is the responsibility of LES to relay the response to the originating LEC. If the requester is a LEC, control passes back to step 517, and the process continues as described above.

If the test result in step 511 is NO, indicating that the packet is a data packet, control passes to conditional branch point 539 (FIG. 8) which tests to determine if the destination address is known to the LEC originating the data packet. If the test result in step 539 is YES, control passes to step 541, which tests to determine if the packet is a unicast packet, i.e., a packet destined to a single LEC. If the test result in step 541 is YES, control passes to step 545, in which the originating LEC establishes a connection to the destination address, if one does not exist already. Control then passes to step 547, in which the data packet is transmitted over the established connection. The process then exits in step 507.

If the test result in either step 539 or step 541 is NO, indicating that either the originating LEC does not know the destination address or the packet is destined for more than one destination address, i.e., it is a broadcast or multicast packet, control passes to step 549, in which the packet is transmitted to the BUS of the sub-ELAN serving the LEC originating the data packet. Next, in step 551, the receiving BUS broadcasts the data packet to all LECs in the sub-ELAN and, consequently, in accordance with the principles of the invention, to the proxy-LECs of the sub-ELAN that are a) attached to remote BUSs and b) are indicated in the forwarding table provided by the LECS that is obtained by the BUS during configuration.

As a result, two distinct parallel paths thereafter result, the first path a) including steps 553 through 557 and b) being performed in each LEC receiving the broadcast data packet, and the second path a) including steps 559 through 579 and b) being performed by the remote BUS and its proxy-LEC.

When control passes to step 553, the LEC receiving the broadcast packet tests to determine if it is one of the destination LECs. If the test result in step 553 is NO, control passes to step 557, in which the packet is discarded. The process then exits in step 507.

If the test result in step 553 is YES, control passes to step 555, in which the receiving LEC processes the packet, e.g., examines the packet header and transmits the packet to higher layers. The process then exits in step 507.

When control passes to conditional branch point 559, because the proxy-LEC receives a broadcast packet, it tests to determine if it had originated the broadcast packet. If the test result in step 559 is YES, control passes to step 561 and the data packet is discarded. The process then exits in step 507.

If the test result in step 559 is NO, indicating that the packet was not originated by that BUS, control passes to step 550, in which the proxy-LEC sends the packet to its attached BUS. Then, control passes to step 551 in the BUS connected to the proxy-LEC, and the process continues as described above.

Figure 9:
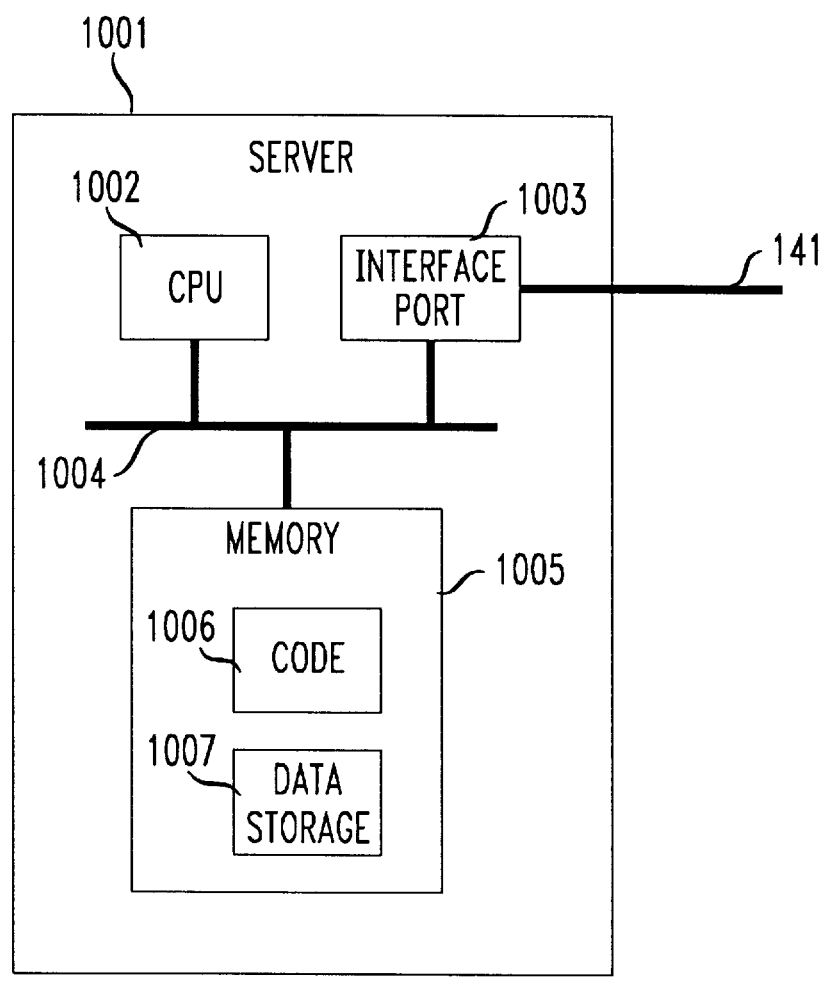
FIG. 9 is a block diagram view of an exemplary embodiment of a generic server which may be used as the servers shown in FIG. 3.

FIG. 9 is a block diagram view of an exemplary embodiment of generic server 1001, which may serve as LES, BUS or LECS. Each server 1001 includes a) central processing unit (CPU) 1002, b) interface port 1003 c) data bus 1004 and d) memory 1005. Central processing unit (CPU) 1002 provides all the computational capability necessary to control the processes of server 1001. Data bus 1004 provides for the exchange of data between the components of server 1001. Interface port 1003 provides for the exchange of data between server 1001 and devices external to server 1001 via link 141. To this end, interface port 1003 contains, for example, well-known data transceivers. Memory 1005 includes 1) code portion 1006, which contains the instructions (program) used by CPU 1002 to control the processes of server 1001, such as those described herein above, and data storage portion 1007, which contains the information necessary to the server to perform its specific function, such as, an address table.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for connecting a first and second sub-emulated local area network (sub-ELAN), said first sub-ELAN including a first local area network (LAN) emulation server (LES) and said second sub-ELAN including a second LES, the apparatus comprising:

first means for connecting said first LES to said second LES as a proxy-LEC in said second sub-ELAN so that said first LES receives information from said second sub-ELAN as a member of said second sub-ELAN; and second means for connecting said second LES to said first LES as a proxy-LEC in said first sub-ELAN so that said second LES receives information from said first sub-ELAN as a member of said first sub-ELAN.

2. The invention as defined in claim 1 wherein the information received by said first LES from said second sub-ELAN originated in another sub-ELAN other than said second sub-ELAN or directly from said second sub-ELAN.

3. The invention as defined in claim 1 wherein said first sub-ELAN includes a first broadcast and unknown server (BUS) and said second sub-ELAN includes a second BUS, and further comprising third means for connecting said first BUS to said second BUS as said proxy-LEC in said second sub-ELAN so that said first BUS receives information from said second sub-ELAN as a member of said second sub-ELAN, and fourth means for connecting said second BUS to said first BUS as said proxy-LEC in said first sub-ELAN so that said second BUS receives information from said first sub-ELAN as a member of said first sub-ELAN.

4. The invention as defined in claim 3 wherein the first LES communicates to said second LES only the information received in a first predefined group of packets and the first BUS communicates to the second BUS only the information received in a second predefined group of packets.

5. The invention as defined in claim 4 wherein the first predefined group of packets is control packets exclusive of flush packets and the second predefined group of packets is data packets and flush packets.

6. The invention as defined in claim 4 wherein the first predefined group of packets is control packets and the second predefined group of packets is data packets and flush packets.

7. An emulated local area network (ELAN) comprising:

a first sub-ELAN having a first LAN emulation client (LEC) and a first LAN emulation server (LES);

a second sub-ELAN having a second LEC and a second LES;

first means for connecting said first LES to said second LES as a proxy-LEC in said second sub-ELAN so that said first LES receives information from said second sub-ELAN as a member of said second sub-ELAN; and second means for connecting said second LES to said first LES as a proxy-LEC in said first sub-ELAN so that said second LES receives information from said first sub-ELAN as a member of said first sub-ELAN.

8. The invention as defined in claim 7 wherein said first sub-ELAN also has a first broadcast and unknown server (BUS) and said second sub-ELAN has a second BUS, and further comprising third means for connecting said first BUS to said second BUS as said proxy-LEC in said second sub-ELAN so that said first BUS receives information from said second sub-ELAN as a member of said second sub-ELAN, and fourth means for connecting said second BUS to said first BUS as said proxy-LEC in said first sub-ELAN so that said second BUS receives information from said first sub-ELAN as a member of said first sub-ELAN.

9. The invention as defined in claim 7 wherein said ELAN further comprises:

a LAN emulation configuration server (LECS) for supplying topology information;

wherein said first and second means for connecting are responsive to said topology information supplied by said LECS for determining if said first and second means for connecting connects said first and second LESs.

10. The invention as defined in claim 7 wherein said ELAN further comprises:

a LAN emulation configuration server (LECS) for supplying forwarding information;

wherein said first means for connecting is responsive to said forwarding information supplied by said LECS for determining if a particular packet received by said first LES is transmitted to said second LES.

11. The invention as defined in claim 7 wherein said first and second means for connecting employ asynchronous transfer mode (ATM) connections.

12. Apparatus for forming an emulated local area network (ELAN) comprising:

a plurality of sub-ELANs, each of said sub-ELANs having (i) a LAN emulation server (LES), (ii) a broadcast and unknown server (BUS), and (iii) a LAN emulation client (LEC), each one of said sub-ELANs having first and second means for connecting the LES and BUS of that one ELAN to the LES and BUS, respectively, of at least another of said sub-ELANs as a proxy-LEC on the another of said sub-ELANs so that the LES and BUS on said one sub-ELAN receive information from the another sub-ELAN, and third and fourth means connecting the LES and BUS of the other sub-ELAN to the LES and BUS, respectively, of said one sub-ELAN as a proxy-LEC on said one sub-ELAN so that the LES and BUS on said another sub-ELAN receive information from said one ELAN; and a LAN Emulation Configuration Server (LECS) for determining a topology for the interconnection of the LECs and BUSs of said sub-ELANs.

13. The invention as defined in claim 12 wherein said LECS determines said topology by retrieving prestored topology information.

14. The invention as defined in claim 12 wherein said LECS determines said topology as a function of a predetermined criterion.

15. The invention as defined in claim 12 wherein said LECS further includes means for transmitting information about said determined topology to said sub-ELANs.

16. The invention as defined in claim 15 wherein said LESs and said BUSs are responsive to said topology information received in their respective sub-ELANs for establishing connections among themselves.

17. The invention as defined in claim 15 wherein said LECS determines said topology and communicates said information about said determined topology to said sub-ELANs upon configuration of said ELAN.

18. The invention as defined in claim 15 wherein said LECS determines said connection topology and communicates said information about said determined topology to said sub-ELANs upon failure in one of said LESs or BUSs of one of said ELANs or in a connection between said LESs or said BUSs.

19. The invention as defined in claim 12 wherein said LECS further determines a forwarding policy for each of said sub-ELANs and wherein said LECS further includes means for transmitting information about said forwarding policy to said sub-ELANs.

20. The invention as defined in claim 19 wherein said LESs and said BUSs are responsive to said forwarding information received in their respective sub-ELANs for forwarding packets among themselves.

21. The invention as defined in claim 19 wherein said LECS determines said forwarding policy and communicates said information about said determined forwarding policy to said sub-ELANs upon configuration of said ELAN.

22. The invention as defined in claim 19 wherein said LECS determines said forwarding polity and communicates said information about said determined forwarding policy to said sub-ELANs upon each change of the topology of said ELAN.

* * * * *